US009174299B2

(12) United States Patent
Groft et al.

(10) Patent No.: US 9,174,299 B2
(45) Date of Patent: Nov. 3, 2015

(54) APPARATUS AND METHOD FOR PORTABLE CALIBRATION OF ELECTROFUSION CONTROLLERS (75) Inventors: William E. Groft, Landenberg, PA (US); David W. Groft, Newark, DE (US); Michael W. Groft, Lincoln University, PA (US)

(73) Assignee: EF Technologies, Inc., Newark, DE (US)

( * ) Notice: Subject to any disclaimer, the term of this patent is extended or adjusted under 35 U.S.C. 154(b) by 1181 days.

(21) Appl. No.: 12/466,726

(22) Filed: May 15, 2009

(65) Prior Publication Data

US 2010/0288011 A1 Nov. 18, 2010

(51) Int. Cl.
| H05B 1/02 | (2006.01) |
| G01K 15/00 | (2006.01) |
| B29C 65/00 | (2006.01) |
| F16L 47/00 | (2006.01) |
| B23K 13/02 | (2006.01) |
| B23K 13/08 | (2006.01) |

(Continued)

(52) U.S. Cl.
CPC ............... *B23K 13/025* (2013.01); *B23K 13/08* (2013.01); *B29C 65/342* (2013.01); *B29C 66/522* (2013.01); *B29C 66/5229* (2013.01); *B29C 66/91313* (2013.01); *B29C 66/91315* (2013.01); *B29C 66/91317* (2013.01); *B29C 66/91641* (2013.01); *B29C 66/91653* (2013.01); *B29C 66/91655* (2013.01); *B29C 66/942* (2013.01); *B29C 66/961* (2013.01); *B23K 2201/06* (2013.01); *B29C 65/3476* (2013.01); *B29C 66/8181* (2013.01); *B29K 2101/12* (2013.01)

(58) Field of Classification Search
CPC .... B29C 66/90; B29C 65/34; G05D 23/2401; G05D 23/2413; G03G 15/2003; H01L 21/67248; H05B 2203/017; H05B 2203/02; G01R 19/0092
USPC ......... 219/490, 520–553, 497, 494, 501, 505; 324/76.11–157
See application file for complete search history.

(56) References Cited

U.S. PATENT DOCUMENTS 3,267,375 A * 8/1966 Olsen ......................... 324/103 R
3,657,926 A * 4/1972 Munson ................ G01L 27/002
374/1

(Continued)

OTHER PUBLICATIONS

International Search Report of the International Searching Authority mailed on Jul. 19, 2010, issued in connection with International Application No. PCT/US10/34842 (2 pages).

(Continued)

*Primary Examiner* — David Angwin
*Assistant Examiner* — Gyounghyun Bae
(74) *Attorney, Agent, or Firm* — McCarter & English, LLP (57) ABSTRACT The method includes providing a portable self-contained calibration device to an electrofusion controller. The calibration device includes internal or external dummy loads to simulate real fittings to be fused and instructs the electrofusion controller to apply electricity to these dummy load. Then, the calibration device uses a measurement sub-system to measure a pre-determined parameter. A microcontroller sub-system determines if there is a difference between the measured values and the expected values. If there is a difference, the calibration device adjusts the electrofusion controller's memory. The calibration device repeats the measurement with a second independent measurement device to ensure accuracy.

9 Claims, 11 Drawing Sheets (51) Int. Cl.
  *B29C 65/34* (2006.01)
  *B29K 101/12* (2006.01)

(56) References Cited

U.S. PATENT DOCUMENTS

| | | | | |
|---|---|---|---|---|
| 4,083,054 A * | 4/1978 | Moraw et al. | | 347/113 |
| 4,288,271 A * | 9/1981 | Campbell et al. | | 156/359 |
| 4,461,951 A * | 7/1984 | Luoma et al. | | 219/497 |
| 4,486,650 A | 12/1984 | Bridgstock et al. | | |
| 4,491,973 A * | 1/1985 | Idol | | 455/115.2 |
| 4,506,144 A * | 3/1985 | Hesford et al. | | 219/497 |
| 4,617,454 A * | 10/1986 | Greenhalgh | | 219/505 |
| 4,642,154 A * | 2/1987 | Thalmann et al. | | 156/272.2 |
| 4,642,155 A * | 2/1987 | Ramsey | | 156/359 |
| 4,700,188 A * | 10/1987 | James | | G01R 21/08 324/110 |
| 4,769,519 A * | 9/1988 | Hall | | 219/667 |
| 4,795,877 A * | 1/1989 | Bridgstock et al. | | 219/109 |
| 4,920,248 A | 4/1990 | Toyoda et al. | | |
| 4,943,706 A * | 7/1990 | Lyall et al. | | 219/494 |
| 4,978,837 A * | 12/1990 | Eggleston | | 219/497 |
| 5,170,042 A * | 12/1992 | Bunn | | 219/497 |
| 5,177,340 A * | 1/1993 | Zaffiro | | 219/494 |
| 5,185,568 A * | 2/1993 | Mothersbaugh et al. | | 324/95 |
| 5,391,860 A * | 2/1995 | Massano et al. | | 219/497 |
| 5,500,510 A * | 3/1996 | Kumagai | | 219/505 |
| 5,620,625 A * | 4/1997 | Sauron et al. | | 219/494 |
| 5,788,789 A * | 8/1998 | Cooper | | 156/64 |
| 5,820,720 A * | 10/1998 | Campbell | | 156/273.9 |
| 5,908,575 A * | 6/1999 | Smith et al. | | 219/633 |
| 5,981,905 A | 11/1999 | Ohmi et al. | | |
| 6,018,136 A | 1/2000 | Ohmi et al. | | |
| 6,036,795 A * | 3/2000 | Sauron et al. | | 156/64 |
| 6,043,465 A * | 3/2000 | Andersen | | F27B 17/0016 219/497 |
| 6,441,352 B1 | 8/2002 | Groft et al. | | |
| 6,479,792 B1 | 11/2002 | Beiermann et al. | | |
| 6,486,439 B1 | 11/2002 | Spear et al. | | |
| 6,486,643 B2 * | 11/2002 | Liu | | 323/268 |
| 6,504,131 B1 | 1/2003 | Hayes | | |
| 6,624,388 B1 | 9/2003 | Blankenship et al. | | |
| 6,639,182 B2 | 10/2003 | Hayes | | |
| 6,670,579 B2 | 12/2003 | Davidson et al. | | |
| 6,680,464 B1 * | 1/2004 | Carter et al. | | 219/544 |
| 6,809,292 B2 | 10/2004 | Spear et al. | | |
| 6,815,640 B1 | 11/2004 | Spear et al. | | |
| 6,849,826 B2 | 2/2005 | Hayes | | |
| 6,858,822 B1 * | 2/2005 | Emerson | | 219/535 |
| 6,924,459 B2 | 8/2005 | Spear et al. | | |
| 6,953,917 B2 * | 10/2005 | Chenault | | 219/497 |
| 7,038,167 B2 | 5/2006 | Hayes | | |
| 7,064,300 B1 * | 6/2006 | Emerson | | 219/535 |
| 7,275,861 B2 * | 10/2007 | Volf | | G01J 5/522 374/1 |
| 7,307,241 B2 | 12/2007 | Hayes | | |
| 7,411,155 B2 | 8/2008 | Hayes | | |
| 7,622,818 B2 * | 11/2009 | Ausman | | H02J 9/061 307/9.1 |
| 8,972,042 B2 * | 3/2015 | Uribe | | B65G 1/026 700/213 |
| 2006/0037955 A1 * | 2/2006 | Gueugnaut et al. | | 219/535 |

OTHER PUBLICATIONS

Written Opinion of the International Searching Authority mailed on Jul. 19, 2010, issued in connection with International Application No. PCT/US10/34842 (5 pages).

* cited by examiner (Prior Art)
FIG. 1

APPARATUS AND METHOD FOR PORTABLE CALIBRATION OF ELECTROFUSION CONTROLLERS

FIELD OF THE INVENTION

The present invention relates generally to calibration equipment. More specifically, the present invention relates to portable calibration equipment for calibrating electrofusion controllers.

BACKGROUND OF THE INVENTION

It is known in the welding industry to use electric heat-weldable fittings (also known as electrofusion fittings) formed of thermoplastic materials to fuse two pipe segments together. Such fittings generally include an electrically resistive heating coil or element positioned adjacent to the inside surfaces of the fitting which are to be welded to one or more other thermoplastic members, such as plastic pipe sections. The electrically resistive heating element typically comprises a coil of wire positioned in the thermoplastic material of the fitting, which is connected to electric contacts attached to an outside surface of the fitting. Electrofusion is an effective method for installing branch connections in pipelines, as well as for tapping into a main gas pipeline. Many vendors supply electrofusion fittings, wherein each of the fittings has a particular fusion voltage and fusion time. Such vendors often have a proprietary method for identifying the fitting to be fused or for controlling various fusion process parameters, such as time and voltage applied to the fitting.

An electrofusion controller is a known piece of equipment that is connected to an electrofusion fitting and is used to weld many types of fittings to a variety of types of plastic pipe. The electrofusion controller provides the required energy (in the form of electrical current) to properly heat the resistive element embedded in the fitting. If the amount of energy provided is too small, the fitting will not be properly bonded to the pipe. If the amount of energy provided is too large, the plastic itself will begin to degrade. If the fusion is not properly controlled, the resulting joint will be faulty and could fail a pressure test before being put into service, or worse, prematurely fail when put into service. It is therefore vital that the controller provide the correct amount of energy. The electrofusion controller provides this energy by applying a regulated voltage or current output to the resistive element in the fitting for a predetermined amount of time, or until a pre-determined amount of energy has been applied.

Since it is the job of the controller to provide a regulated voltage or current for a pre-determined amount of time, it is important that the controller is capable of accurately measuring these parameters. Important parameters include, but are not limited to: output voltage, output current, time, ambient temperature and fitting resistance. Proper calibration of the controller is therefore essential for its proper operation.

Traditionally, calibration of electrofusion controllers is carried out by a trained technician in a laboratory environment. As a result, electrofusion controllers must be shipped to a qualified facility so that calibration can be performed (typically once per year). The resultant "down time" usually lasts one or more weeks (including time in transit), which is undesirable and can cost customers shipping fees and lost productivity. As such, there is a need to reduce the down time associated with calibration and to obviate the need to ship electrofusion controllers to remote locations to perform calibration.

SUMMARY OF THE INVENTION

The present invention relates to an apparatus and method for portable calibration of electrofusion controllers. A portable self-contained calibration device is provided, which presents an electrofusion controller with dummy loads to simulate real fittings to be fused. The calibration device instructs the electrofusion controller to apply electricity to the dummy load. Then, the calibration device measures parameters outputted by the electrofusion controller (such as voltage, current, and time) with predefined parameters. If there is a difference between the expected value and the measured values, the calibration device adjusts the electrofusion controller's memory. The measurement is repeated with a second independent measurement device to provide accuracy. The calibration device of the present invention therefore allows for field calibration of electrofusion controllers, thereby obviating the need to ship such controllers to remote locations.

DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to an apparatus and method for remote calibration of electrofusion controllers, as described in detail below with reference to FIGS. 1-11. As used herein, the term "control box" is also used to refer to an electrofusion controller. Furthermore, the terms "remote" and "portable" are used interchangeably throughout the application.

Figure 1:
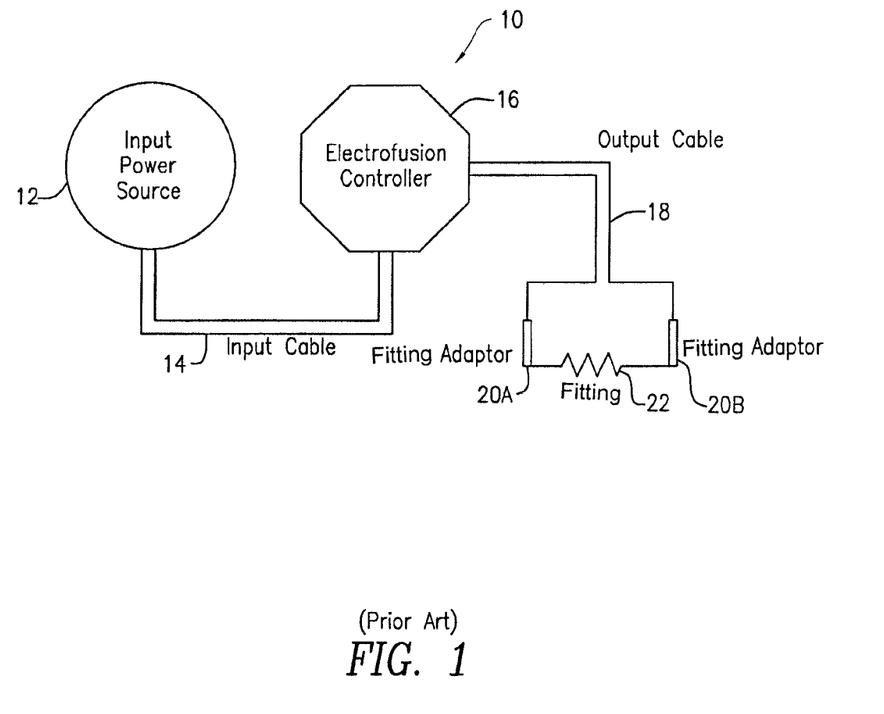
FIG. 1 is a bock diagram showing a typical electrofusion control system.

FIG. 1 is a block diagram showing a typical electrofusion control system implemented in a typical installation, indicated generally at 10. The installation 10 includes an input power source 12 connected via a input cable 14 to a electrofusion controller 16, which is connected via an output cable 18 to fitting adaptors 20a-20b placed on a fitting 22. Of course, the arrangement and number of components shown in FIG. 1 could be varied as desired without departing from the spirit or scope of the present invention. The electrofusion controller 16 provides the required energy to properly heat the element embedded in the fitting 22. As described below, the electrofusion controller 16 could be programmed to output a certain voltage and current, or it could select the appropriate outputted voltage and current based on programmed instructions. The appropriate outputted parameter could be a function of, among other variables, ambient temperature.

Figure 2:
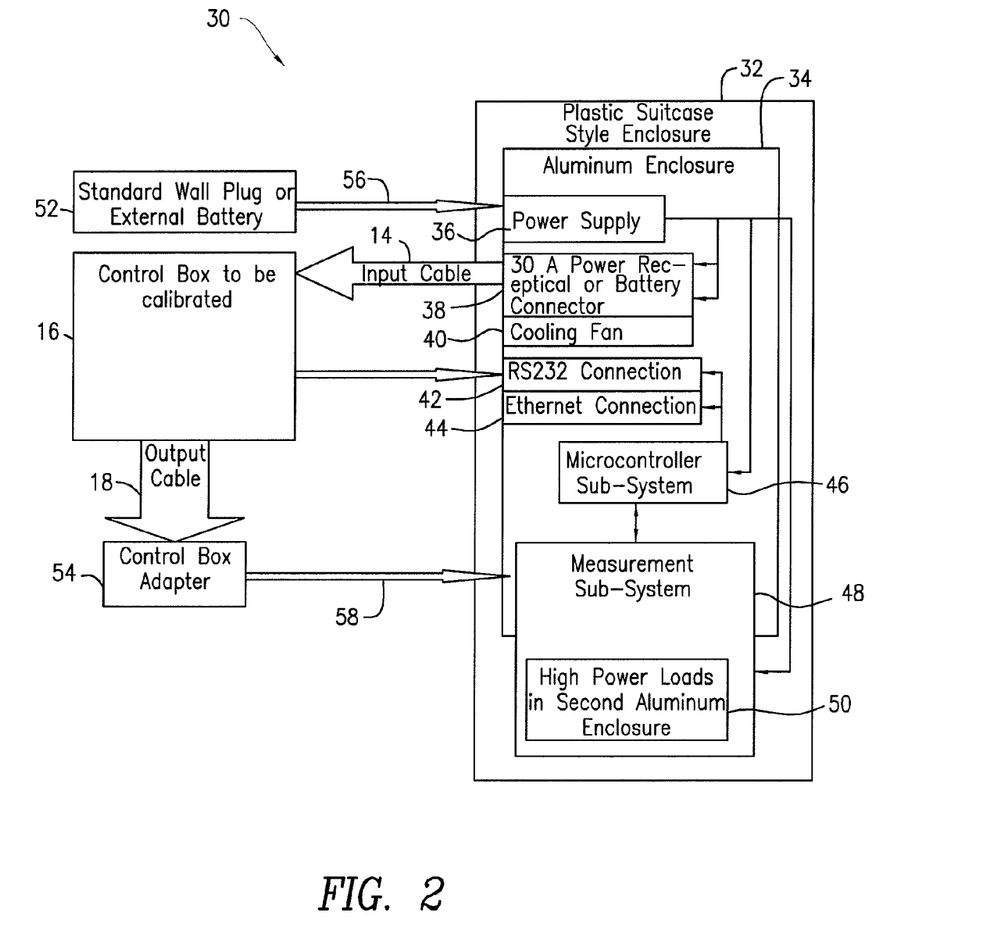
FIG. 2 is a block diagram showing the portable calibration system of the present invention.

FIG. 2 is a block diagram showing the portable calibration system of the present invention, indicated generally at 30. The calibration device 30 includes an enclosure 32 (which could be in the form of a plastic, durable, suitcase-style enclosure, a metal enclosure, etc.), an aluminum enclosure 34 positioned within the enclosure 32, a power supply sub-system 36, a power receptacle and/or battery connector 38, a cooling fan 40, a data port 42, an Ethernet connection 44, a microcontroller sub-system 46, a measurement sub-system 48, and a high-power load enclosure 50. It is noted that the enclosures 34 and 50 need not be manufactured from aluminum, and that other materials could be used, such as materials with high temperature resistances. Aluminum is advantageous because it facilitates cooling the calibration device 30. The electronics, specifically the measurement sub-system 48 need to be kept cool. The power supply sub-system 36 is connected to a standard wall plug 52 (e.g., 120 or 240 volts AC) via the a power supply input cable 56, to provide power to the system. The electrofusion controller 16 is connected to the power receptacle 38 through the input cable 14, and is further in communication with the data port 42. The electrofusion controller 16 is also connected to a control box adaptor 54 via the output cable 18. The control box adapter is further connected with the measurement sub-system 48 via input cable 58. The data port 42 could be an RS232 serial connection, or any other suitable type of data connection (e.g., parallel cable, twisted pair wire, coaxial cable, etc.) which allows for bidirectional communication between the system 30 and the controller 16.

Figure 3:
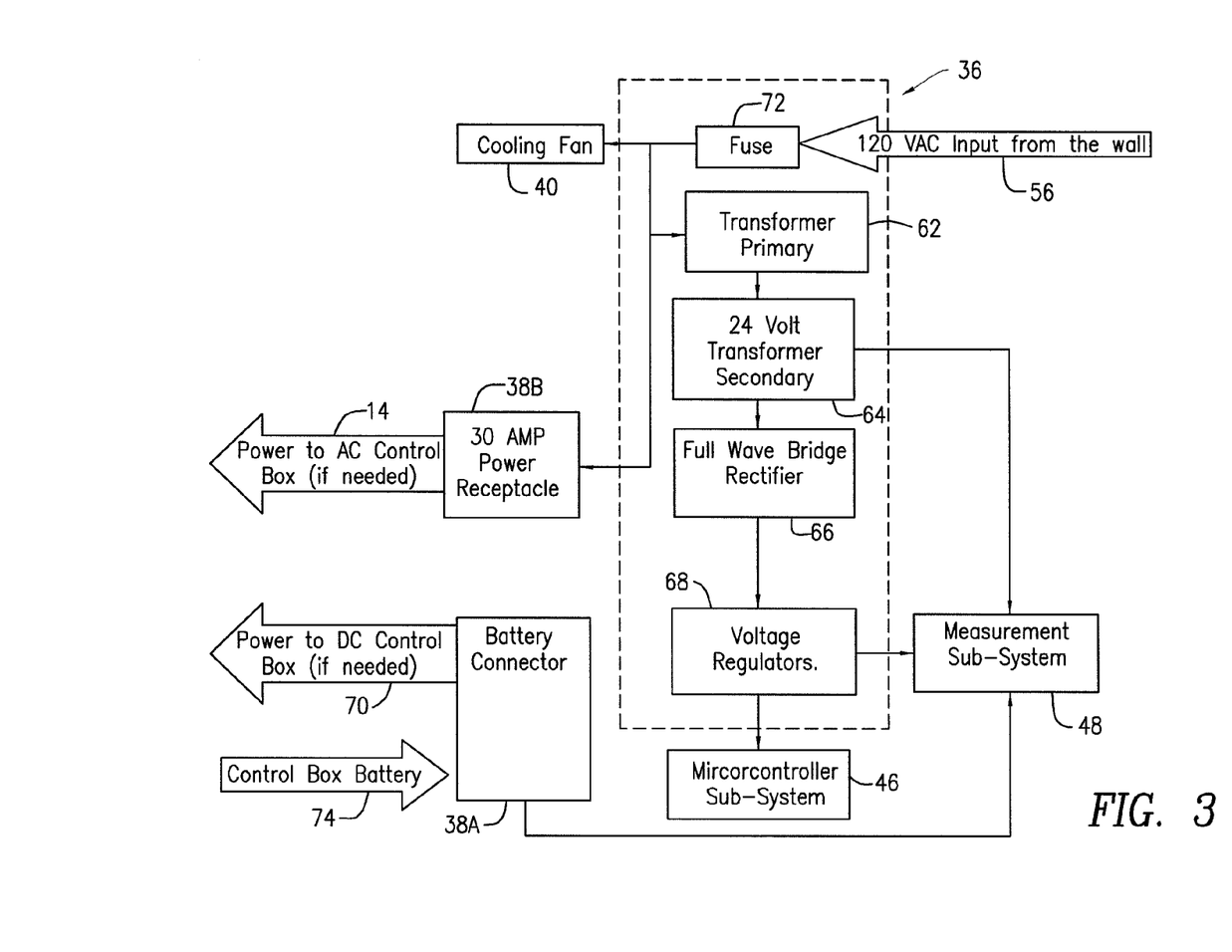
FIG. 3 is a block diagram showing the power supply sub-system of FIG. 2 in greater detail.

FIG. 3 is a block diagram showing the power supply sub-system 36 of FIG. 2 in greater detail. The power supply sub-system 36 includes a fuse 72 connected to power supply input cable 56 and further connected to cooling fan 40, the transformer having a primary winding 62 and power receptacle 38B. Primary winding 62 is further connected to secondary winding 64 of the transformer which is connected to a full wave bridge rectifier 66 which, in turn, is connected to voltage regulator 68 which is further connected to the measurement sub-system 48 to provide power to the measurement sub-system 48. Secondary winding 64 is further in communication with the measurement sub-system so that measurement sub-system 48 can measure the input voltage for calibration. Additionally, the full wave bridge rectifier 66 is connected to a voltage regulator 68 for providing DC power (e.g., 3.3 volts DC) to the microcontroller sub-system 46. Optionally, a battery connector 38A can be connected to measurement sub-system 48, so that the voltage of control box battery 74 can be measured if required for calibration. The battery connector 38A is also used to provide power to a DC control box 70 during the calibration process.

Figure 4:
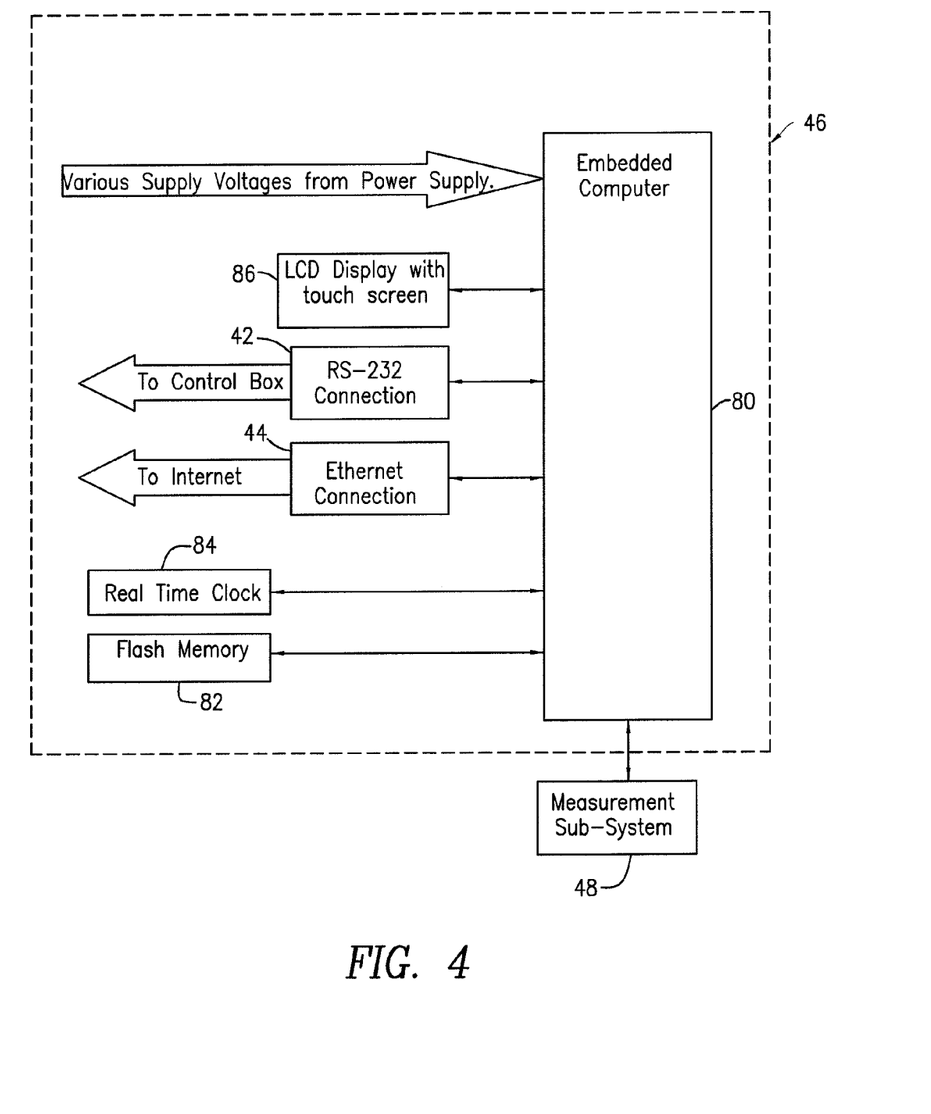
FIG. 4 is a block diagram showing the microcontroller sub-system of FIG. 2 in greater detail.

FIG. 4 is a block diagram showing the microcontroller sub-system 46 of FIG. 2 in greater detail. The microcontroller sub-system 46 includes an embedded computer 80 (e.g., a microcontroller, microprocessor, etc.) receiving various supply voltages from the power supply sub-system 36 and connected to a memory 82, a real-time clock 84, the Ethernet connection 44, the data port 42, and an LCD touchscreen 86. In one embodiment embedded computer 80 may be Coldfire Derivative MCF52223CAF80 microprocessor manufactured by Freescale Semiconductor, Inc. The memory 82 could be in the form of non-volatile memory, such as EPROM, EEPROM, flash memory, etc., and could be programmed to include the processing logic discussed below in connection with FIG. 9 as well as the calibration history of calibration device 30. Alternatively, such logic could be coded directly into the embedded computer 80. The embedded computer 80 is in communication with the measurement sub-system 48 and executes the processing logic stored in the memory 82. Data port 42 allows for bidirectional communication between the electrofusion controller 16 and the calibration device 30. Ethernet connection 44 allows for bidirectional communication with an external computing device such as a PC, PDA, etc. Additionally, Ethernet connection 44 allows the calibration device 30 to be interconnected with a communications network if desired, for downloading or logging of data from the system as well as for allowing remote access to, and control of, the calibration device 30. LCD touchscreen 86 directs the operator of the calibration device 30 through the calibration process, for example, by directing the operator to connect different components together, turn on the control box, etc. In an alternate embodiment of the present invention, the microcontroller sub-system 46 maybe substituted with an external computer (e.g., a stand alone computer, personal digital assistant, or any other suitable device, etc.).

Figure 5:
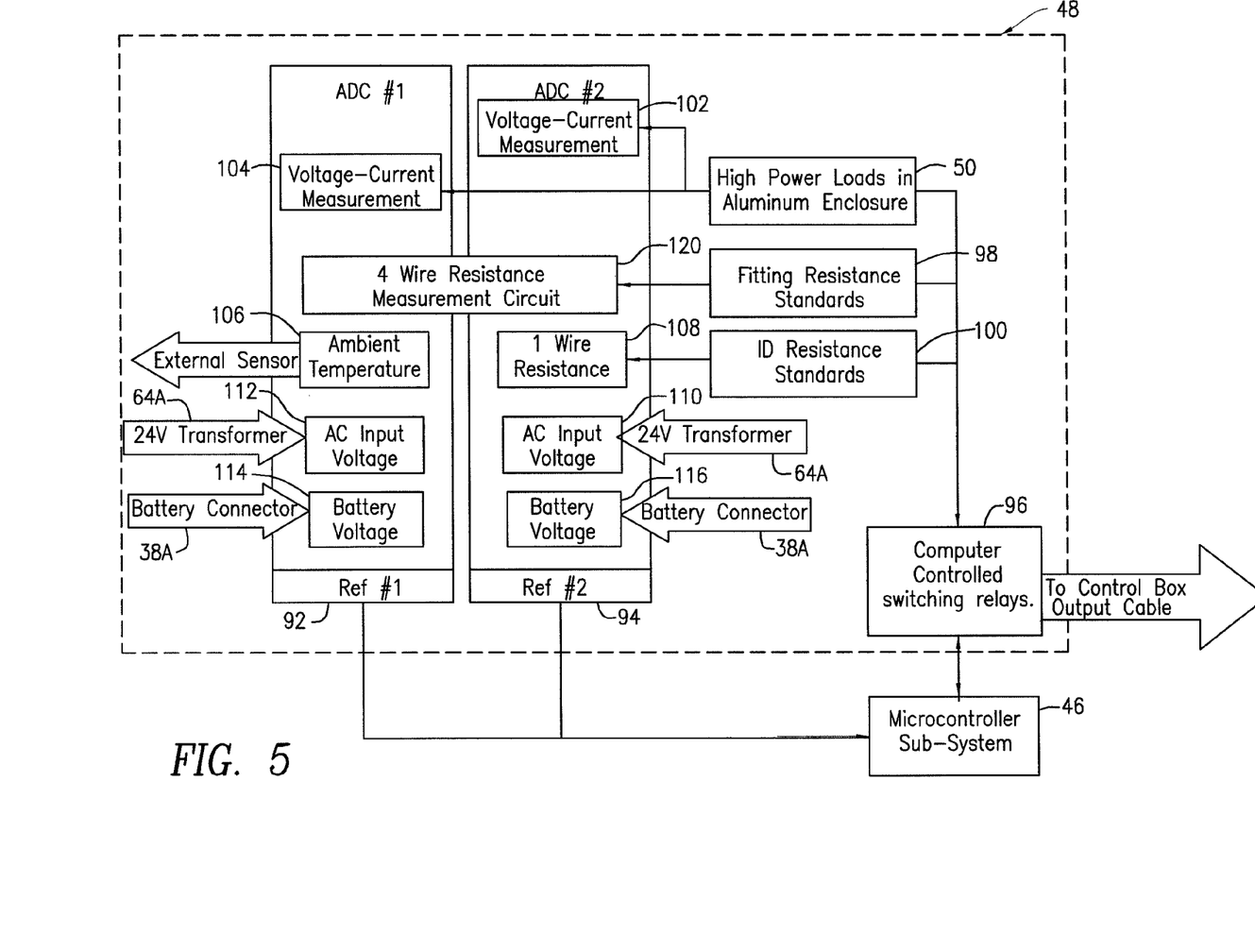
FIG. 5 is a block diagram showing the measurement sub-system of FIG. 2 in greater detail.

FIG. 5 is a block diagram showing the measurement sub-system 48 of FIG. 2 in greater detail. The measurement sub-system 48 includes a first independent measurement device 92 and a second independent measurement device 94, both of which could be in the form of analog-to-digital (ADC) converters. The first independent measurement device 92 includes a voltage and current measurement device 104, resistance measurement circuit 120, temperature gage 106, AC input voltage 112 in communication with secondary transformer connector 64A, and, battery voltage 114 in communication with battery connector 38A. The second independent measurement device 94 contains a voltage and current measurement device 102, wire resistance measurement device 120, 1-wire resistance 108, AC input voltage 110 in communication with secondary transformer connector 64A, and battery voltage 116 in communication with battery connector 38A. The 1-wire resistance 108 is further in communication with ID resistance standards 100, which are predefined standards stored in memory. The voltage current measurement devices 102 and 104 connected with various resistors, described below, positioned in high power load enclosure 50, which operate as dummy loads to mimic resistive elements of fitting 22.

Microcontroller sub-system 46 directs the electrofusion controller 16 to fuse an appropriate resistor based on the electrofusion controller's fusing capacity. Wire resistance measurement device 120 is connected with fitting resistance standards 98. The high power load 50, fitting standard 98, and ID resistance standard 100 are further connected with computer controlled switching relays 96. The switching relays 96 are controlled by the microcontroller sub-system 46. The microcontroller sub-system 46 also directly communicates with the first independent measurement device 92 and the second independent measurement device 94.

Figure 6:
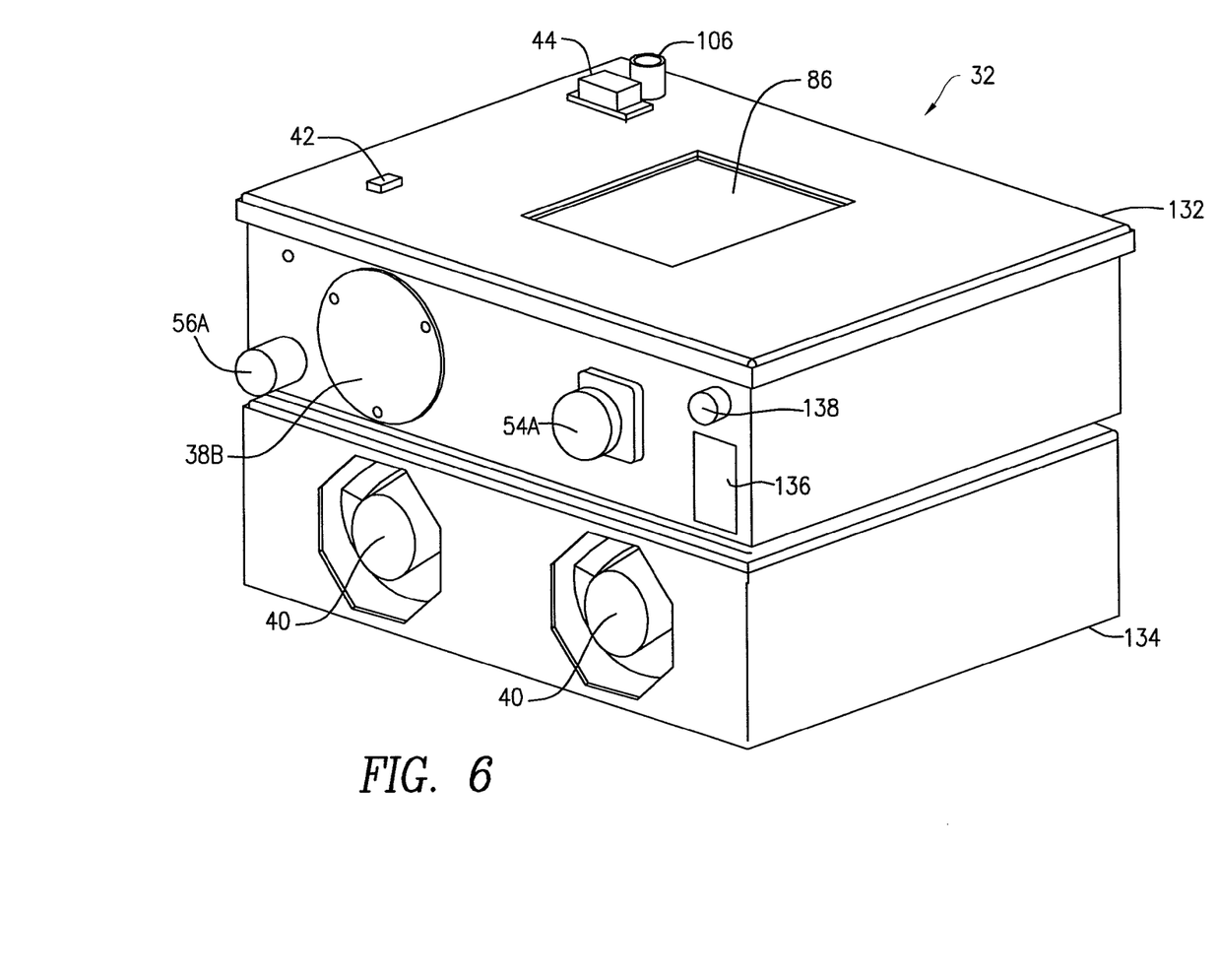
FIG. 6 is a perspective view showing the portable calibration system of the present invention.

FIG. 6 is a drawing showing a perspective view of the calibration unit of the present invention. The calibration unit includes an enclosure 32 having an upper housing portion 132, a touchscreen 86, a temperature gage 106, Ethernet connection 44, data port 42, power supply input connection 56A, the power receptacle 38B (shown with an optional cover plate in position over the receptacle 38B), the control box adapter connection 54A, a fuse holder 138, and an on/off switch 136. The fuse holder 138 houses a fuse that prevents overloading of the power supply sub-system 36. A lower housing portion 134 is also provided, which includes the cooling fans 40 used to cool the high power load resistors enclosed in the lower housing portion 134 (not visible in this view).

Figure 7:
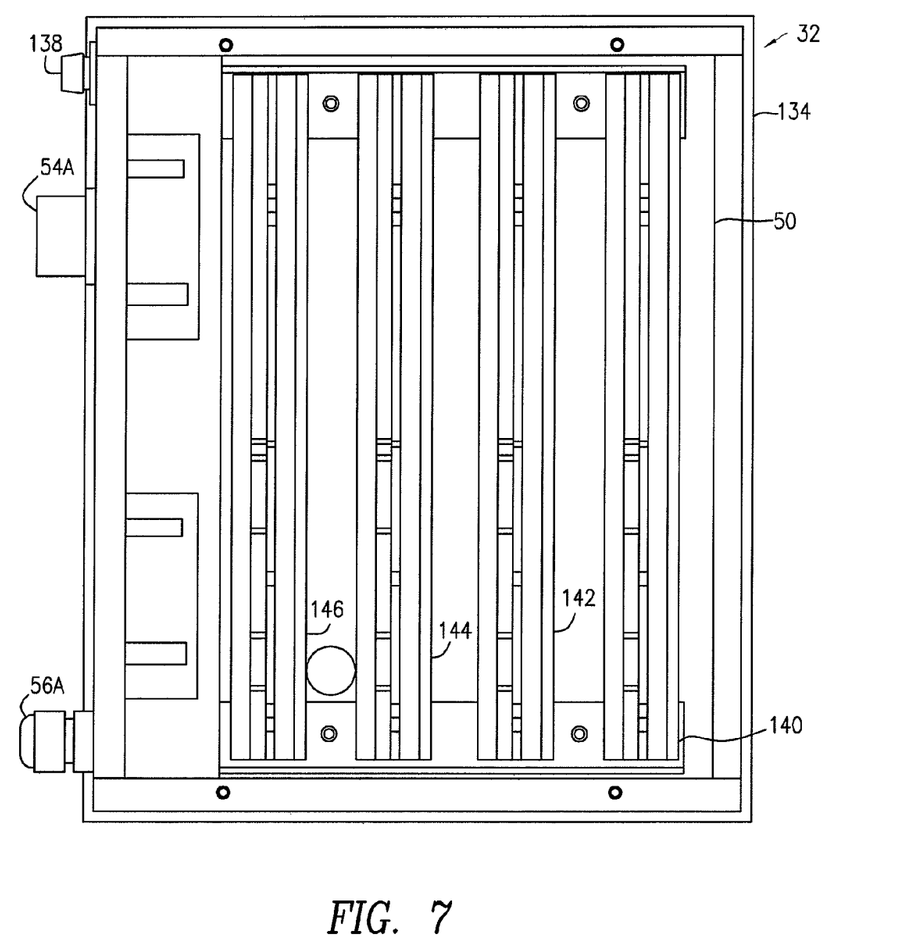
FIG. 7 is an interior view of the portable calibration system of the present invention.
Figure 8:
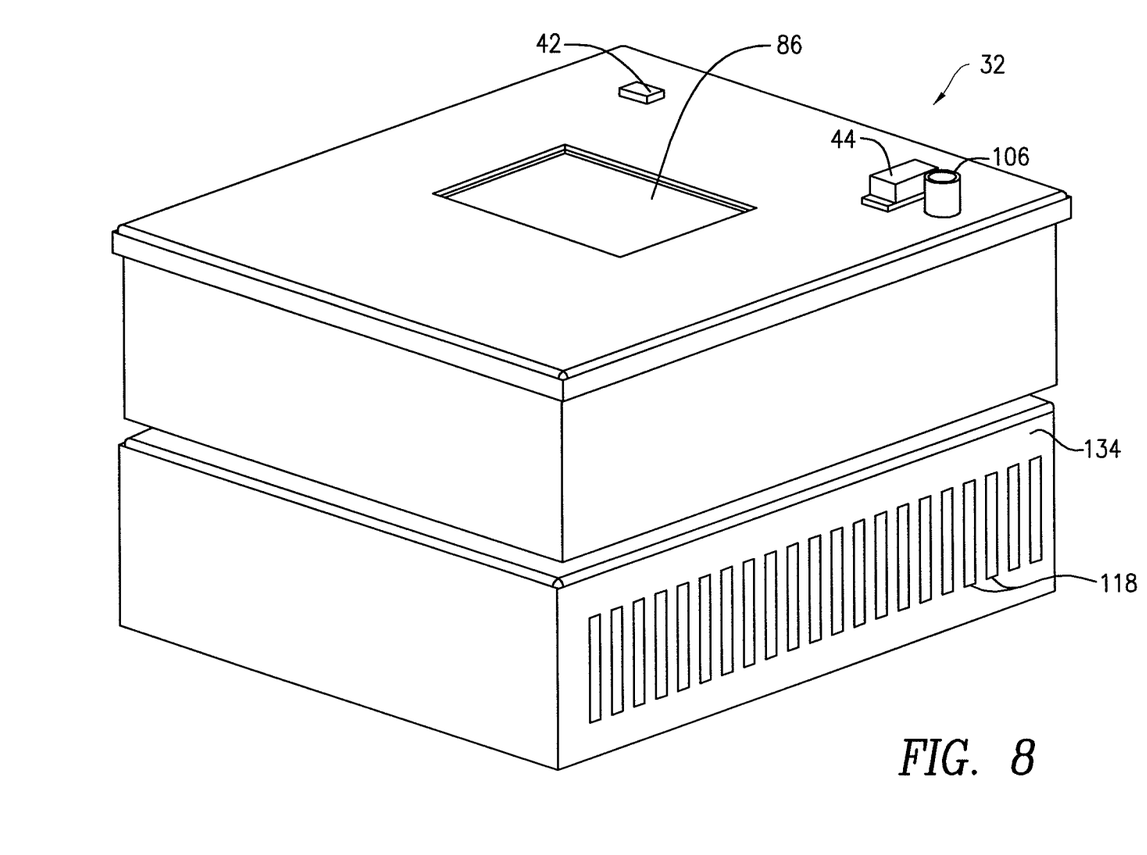
FIG. 8 is another perspective view of the portable calibration system of the present invention.

FIG. 7 is a drawing showing the lower housing portion 134. The lower housing portion 134 includes a plurality of high power load resistors 140, 142, 144 and 146 within the high power load enclosure 50. As discussed above, the load resistors 140, 142, 144 and 146 provide dummy fusion loads for use in calibrating an electrofusion controller. As can be seen in FIG. 8, air flow vents 148 are provided in lower housing portion 134 to facilitate cooling of the load resistors 140, 142, 144 and 146.

Figure 9:
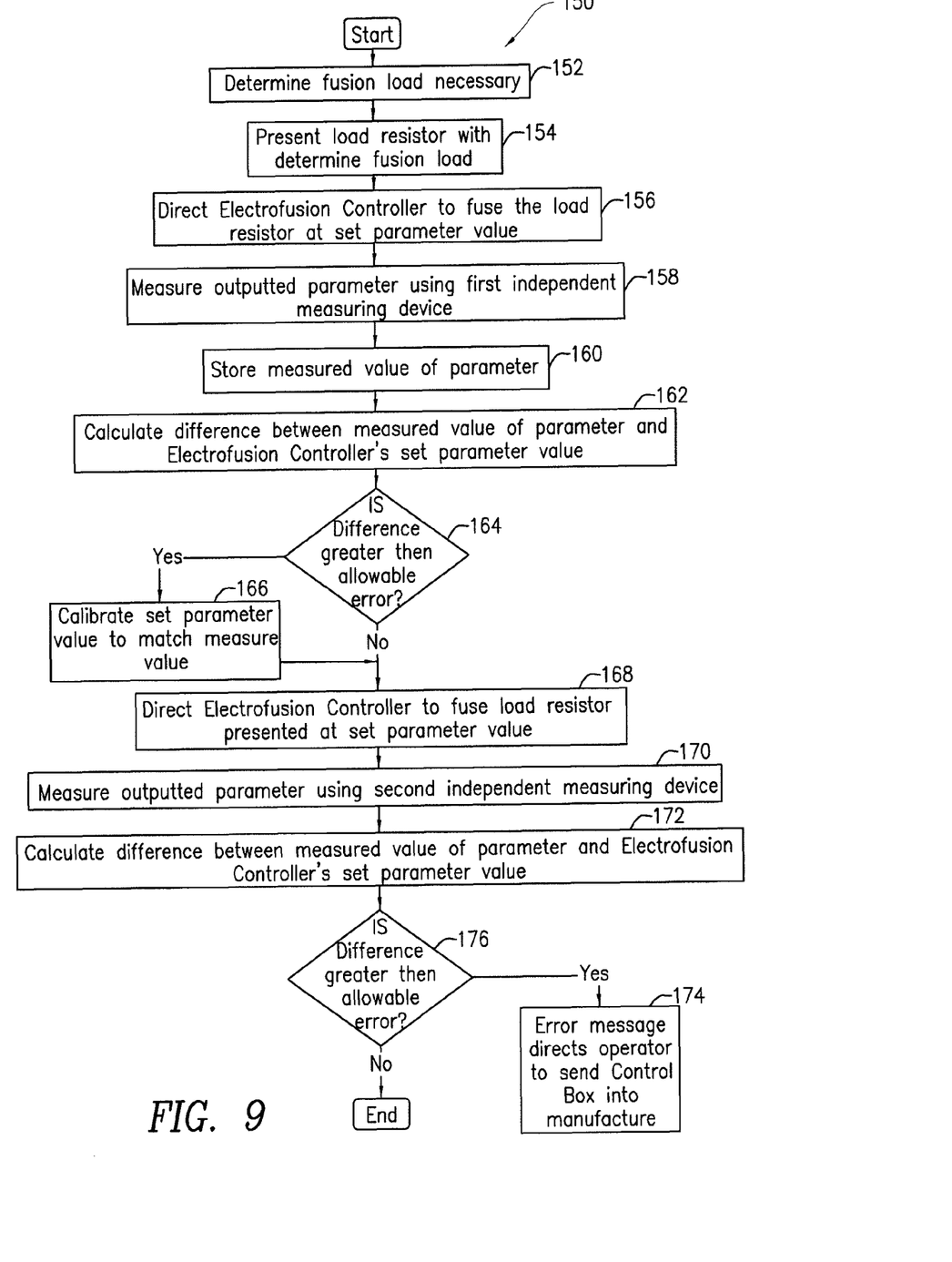
FIG. 9 is a flowchart showing processing steps implemented by the portable calibration system of the present invention for calibrating an electrofusion controller.

FIG. 9 is a flowchart showing processing steps according to the present invention, indicated generally at 150, for controlling calibration. In step 152, the calibration system 30 is connected with the electrofusion controller 16, power is turned "on," and the calibration system 30 communicates with the electrofusion controller 16 to determine the fusion load that the electrofusion controller 30 requires. In step 154, the calibration system 30 selects the appropriate high power load resistor 140, 142, 144 or 146 which matches the fusion load required by the electrofusion controller 16. In step 156, the microcontroller sub-system 46 directs the electrofusion controller 16 to fuse the high power load resistor selected in 154. In step 158, the first independent measurement device 92 measures a selected output parameter and in step 160, that measured parameter is stored in flash memory 82. In step 162, the embedded computer 80 calculates the difference between the value of the parameter stored in step 160 and the electrofusion controller's preset parameter value.

In step 164, if the calculated value in step 162 is greater than allowable error, a pre-defined error threshold established by the manufacturer of the control box 16 and programmed into the nonvolatile memory of the calibration device 30, step 166 is performed, alternately step 168 is performed. In step 166, the microcontroller sub-system 46 communicates with the electrofusion controller through data port 42 and calibrates the electrofusion controller's circuitry to match the stored value for the parameter. In step 168, the microcontroller sub-system 46 directs the electrofusion controller 16 to fuse the high power load resistor of step 154. In step 170, the second independent measurement device 94 measures the previously selected output parameter and stores that measured parameter in flash memory 82. In step 172, the embedded computer 80 calculates the difference between the value of the parameter stored in step 168 and the electrofusion controller's preset value. In step 176, if the calculated value in step 172 is greater than allowable, step 174 is performed and the operator receives an error message on LCD touchscreen 86 informing them that there was an error in the calibration process and suggesting that the device be sent to its manufacturer for calibration.

Figure 10:
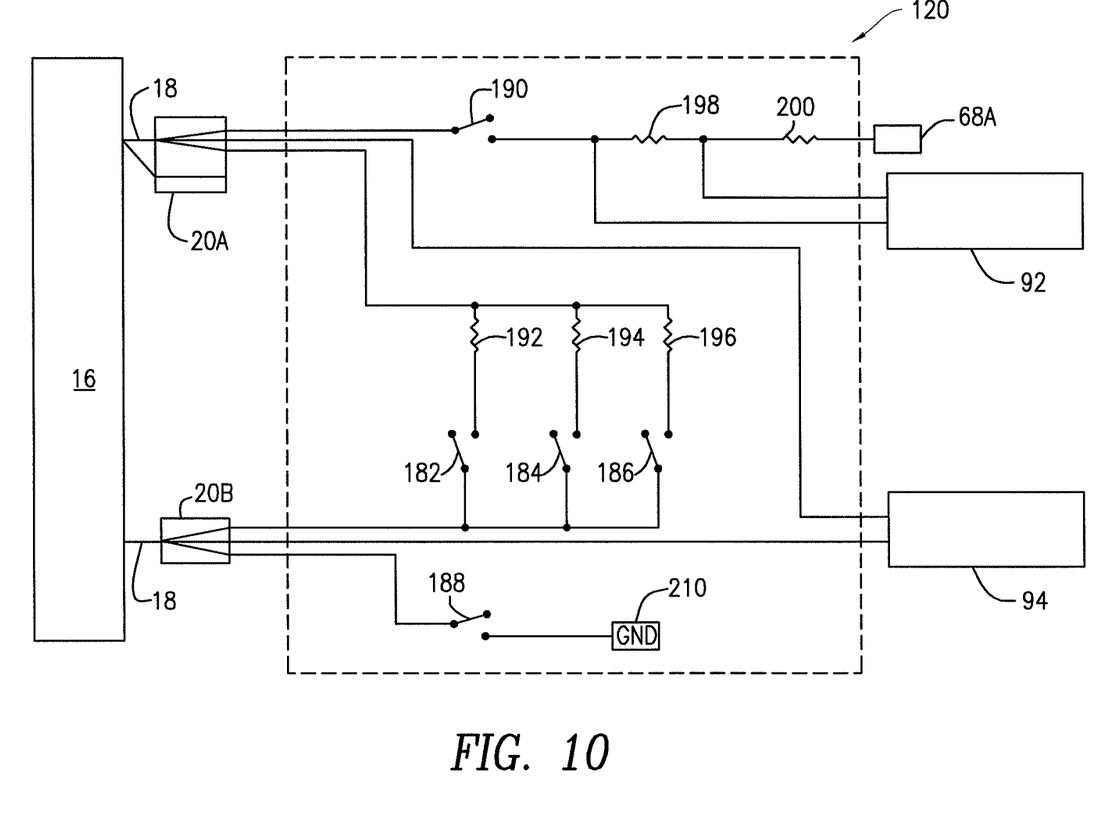
FIG. 10 is a block diagram showing the wire resistance device of FIG. 5 in greater detail.

FIG. 10 is a block diagram showing the wire resistance measurement device 120 of FIG. 5 in greater detail. In this embodiment, the wire resistance measurement device 120 uses a standard 4-wire resistance measurement system to calibrate control box's 16 resistance measurement device. The wire resistance measurement device 120 attaches to fitting adaptors 20A and 20B and includes switches 182, 184, 186, 188 and 190, standard resistors 192, 194, and 196, 198 and 200, an excitation voltage 68A, and ground 210. The values of the standard resistors 192, 194 and 196 and resistor 198 are stored in nonvolatile memory. Switches 182, 184 and 186 each connect with standard resistors 192, 194, and 196 respectively. Resistors 198 and 200 in combination with the excitation voltage 68A and ground 210 by the 4 wire resistance measurement system to independently measure the standard resistors 192, 194 and 196 and verify the values stored in nonvolatile memory are correct. Initially, switches 182, 184 or 186 are then closed to, one at a time, present standard resistors 192, 194 or 196, one at a time, to control box 16 to measure. Control box 16 is calibrated to ensure its measured resistance matches that stored in nonvolatile memory. Switch 190 and 180 are then closed to allow independent measurement device 92 and 94 to measure the standard resistors 192, 194 or 196. When switches 190 and 188 are closed, current flows from the excitation voltage 68A through resistors 200, 198 and one of the standard resistors that is selected in turn 192, 194 and 196 to ground 210. The voltage drop across the resistance standard that is selected 192, 194 or 196 ($V_{std}$) is measured directly by independent measurement device 94. The electrical current flowing through the resistance standard that is selected 192, 194 or 196 ($I_{std}$) is calculated by the embedded computer 80 using the value of resistor 198 and the voltage measurement supplied by independent measurement device 92. The value of the standard resistor that is selected 192, 194 or 196 ($R_{std}$) is then calculated by the embedded computer 80 using the formula $R_{std}=V_{std}/I_{std}$. Each of the standard resistors, 192, 194 and 196 are measured by the above process.

Figure 11:
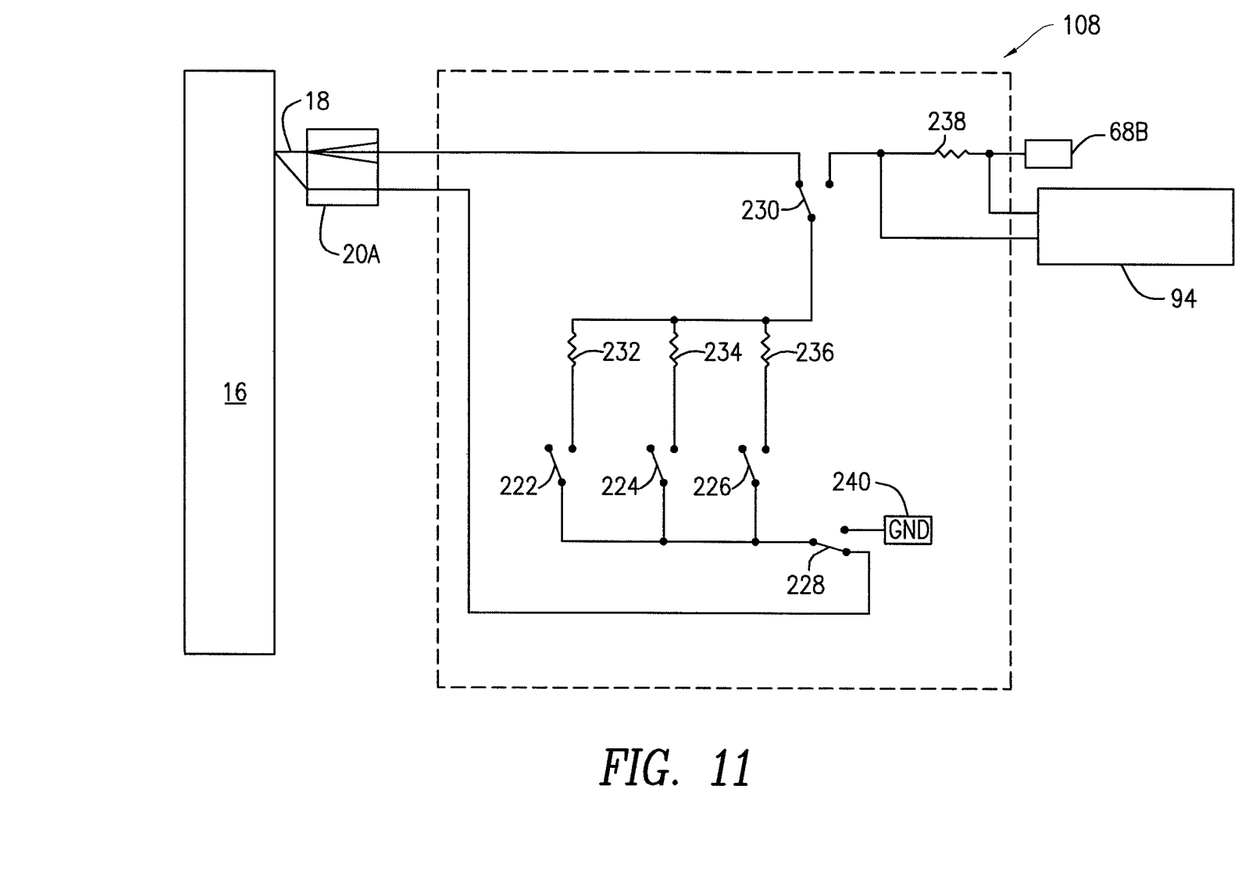
FIG. 11 is a block diagram showing the 1-wire resistance device of FIG. 5 in greater detail.

FIG. 11 shows the 1-wire resistance 108 used to produce ID resistance standard 100 of FIG. 5 in greater detail. If needed, the 1-wire resistance 108 measures and calibrates the control box's 16 ability to measure an additional resistor in fitting 22 through fitting adaptor 20A. 1-wire resistance 108 attaches to fitting adaptor 20A and includes switches 222, 224, 226, 228 and 230, standard resistors 232, 234, 236 and 238, an excitation voltage 68B and ground 240. The values of the standard resistors 232, 234, 236 and 238 are stored in nonvolatile memory. Switches 222, 224, 226 and 230 connect to standard resistors 232, 234, 236 and 238 respectively. Resistor 238 in combination with excitation voltage 68B and ground 240 are used by the 1-wire resistance measurement system to independently measure the standard resistors 232, 234 and 236 and verify the values stored in nonvolatile memory are correct. Initially switches 222, 224 or 226 are closed in turn to present one of standard resistors 232, 234 or 236 to control box 16 to measure. Control box 16 is then calibrated to ensure its measured resistance matches that stored in nonvolatile memory. Switch 230 and 228 are then closed to allow independent measurement device 94 to measure the standard resistors 232, 234 or 236. When switches 238 and 228 are closed, current flows from the excitation voltage 68B through resistor 238 and standard resistor 232, 234 or 236 to ground 240. The voltage drop across the resistance standard 232, 234 or 236 ($V_{std}$) is measured directly by independent measurement device 94. The electrical current flowing through the resistance standard 232, 234 or 236 ($I_{std}$) is calculated by the embedded computer 80 using the value of resistor 238 and the voltage measurement supplied by independent measurement device 94. The value of the standard resistor 232, 234 or 236 ($R_{std}$) is then calculated by the embedded computer 80 using the formula $R_{std}=V_{std}/I_{std}$. It should be noted that excitation voltage 68A and 68B of FIGS. 10 and 11 could be supplied from voltage regulator 68.

The controller may be programmed to calibrate different parameters in the following sequence: resistance, AC input voltage and/or battery voltage, output current, output voltage, temperature, and ID resistance. It should be noted that the sequence of calibration could be varied, or other parameters could be included, without departing from the spirit or scope of the present invention.

Having thus described the invention in detail, it is to be understood that the foregoing description is not intended to limit the spirit or scope thereof. What is desired to be protected by Letter Patent is set forth in the appended claims.

What is claimed is:

1. A device for calibrating an electrofusion controller for use in fusing thermoplastic pipes, the device comprising:
    a housing having means for connecting the device to an electrofusion controller,
    a microcontroller sub-system within the housing in communication with the electrofusion controller, and
    at least one computer-controlled relay in communication with and controlled by the microcontroller subsystem, and
    a measurement sub-system within the housing in communication with the microcontroller sub-system and the electrofusion controller,
    wherein the measurement sub-system includes a first independent measurement device and a second independent measurement device, and
    wherein the microcontroller sub-system causes the electrofusion controller to supply a first fusing current, the measurement sub-system measures a first electrical parameter corresponding to the first fusing current using the first independent measurement device within the housing, the microcontroller sub-system adjusts a pre-defined parameter of the electrofusion controller based upon the measured first electrical parameter to calibrate the electrofusion controller, the microcontroller sub-system causes the electrofusion controller to supply a second fusing current, the measurement sub-system measures a second electrical parameter corresponding to the second fusing current using the second independent measurement device within the housing, the microcontroller sub-system calculates a difference between the second electrical parameter and the pre-defined parameter, and the microcontroller sub-system indicates an error if the difference is greater than an allowable error.

2. The apparatus of claim 1, wherein the device is portable.

3. The apparatus of claim 1, wherein the housing further comprises at least one load resistor for receiving the fusing current.

4. The apparatus of claim 3, wherein the housing further comprises means for cooling the at least one load resistor.

5. The apparatus of claim 4, wherein the housing further comprises upper and lower housing portions, wherein the upper housing portion houses the microcontroller and measurement subsystems and the lower housing portion houses at least one load resistor and the means for cooling the load resistor.

6. The apparatus of claim 1, wherein the measurement sub-system further comprises first and second analog-digital converters for measuring the electrical parameter.

7. The apparatus of claim 1, wherein the measured electrical parameter comprises a resistance parameter, a voltage parameter, a current parameter, or a time parameter.

8. The apparatus of claim 1, wherein the pre-defined parameter of the electrofusion controller comprises a resistance parameter, a voltage parameter, a current parameter, or a time parameter stored in a memory of the electrofusion controller.

9. The apparatus of claim 1, wherein the microcontroller sub-system calibrates the electrofusion controller by replacing rewriting the pre-defined electrical parameter of the electrofusion control box with a new electrical parameter based upon the measured electrical parameter.

* * * * *